(No Model.)
W. J. LANE.
METHOD OF ATTACHING THE GRINDING PLATES OF MILLS.
No. 294,738. Patented Mar. 4, 1884.
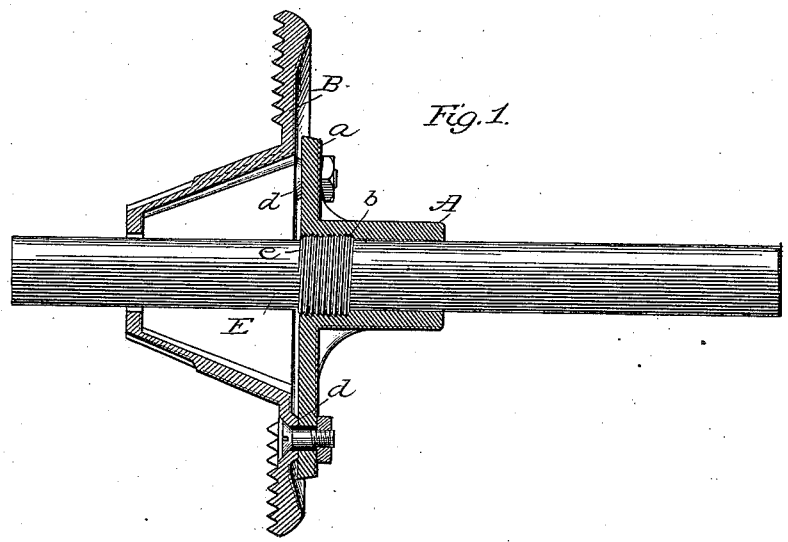
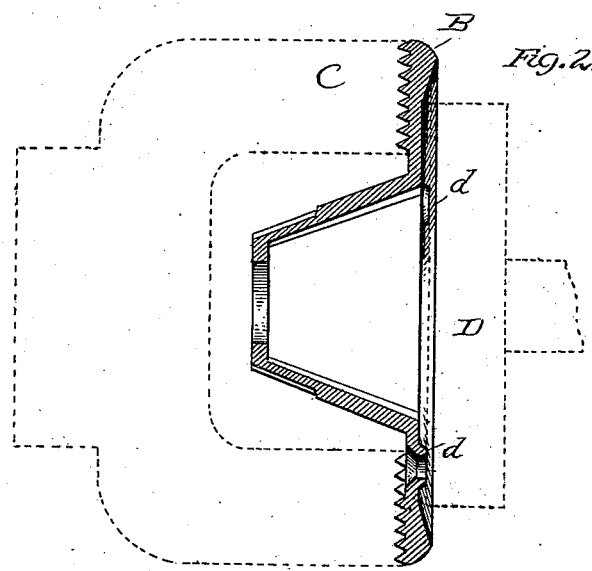
Attest:
Inventor
William J Lane
by Joyce & Spear,
Attys.

UNITED STATES PATENT OFFICE.

WILLIAM J. LANE, OF POUGHKEEPSIE, NEW YORK.

METHOD OF ATTACHING THE GRINDING-PLATES OF MILLS.

SPECIFICATION forming part of Letters Patent No. 294,738, dated March 4, 1884.

Application filed August 21, 1883. (No model.)

*To all whom it may concern:*

Be it known that I, WILLIAM J. LANE, of Poughkeepsie, in the county of Dutchess and State of New York, have invented a new and useful Improvement in Methods of Attaching the Grinding-Plates of Mills; and I do hereby declare that the following is a full, clear, and exact description of the same.

My invention relates to the method of attachment of the hard-metal revolving grinding-plate to the spindle of an iron mill, such as are used for grinding small quantities of various articles.

The invention consists in the method of fitting the parts and putting them together. The object of the invention is to provide an easy and practicable method of attaching the grinding-plate to the mill-spindle, whereby the truthfulness of the plate may be assured.

In the accompanying drawings, Figure 1 represents a section through the soft-iron hub and grinding-plate, with the spindle in side elevation. Fig. 2 represents the grinding-plate in section similar to Fig. 1, and in dotted lines the chuck for holding the same upon one side and the emery-wheel for truing the back upon the other.

In mills of this class in which the grinding or cutting is performed by concentric rows of pyramidal-shaped teeth running between each other, it is important that the revolving grinding-plate be attached to its spindle in such a way as that its rows or circles of cutting-teeth may run as perfectly true as possible. As it is impracticable to shape or bore these white hard grinding-plates by means of steel tools, I take a soft-iron hub, A, with a flange, $a$, having three or more points to receive bolts. I attach this flange to a face-plate of a lathe prepared to receive it in such a way that the three or more portions of the flange referred to are in contact with the true surface of the face-plate. While secured in this position the hub is bored the proper size to receive the mill-spindle, and a cutter on the reamer chambers out one end of the hole to a larger size, as shown at $b$, in which chamber a thread is tapped or cut to fit a corresponding thread on the spindle. This method of boring assures the truthfulness in the same plane of the three or more points of the flange with regard to the hole for the spindle. I next secure the hard-metal revolving grinding-plate B to a chuck, C, on which has been turned one or more annular projections or grooves to receive the teeth of the same. While secured in this position, the chuck is caused to revolve, and a rapidly-revolving emery-wheel, (shown in dotted lines in Fig. 2, and marked D,) carried by the tool-post of the lathe, is brought in contact with the back of the grinding-plate and the surface is made true, the same as would be done with a steel tool if the grinding-plate were soft. I prefer to make slight projections $d$ $d$ on the hard metal about the holes, which are formed in the casting for bolts, so as to reduce the grinding to these points alone. As the grinding-teeth of this plate are held true by the chuck, it is evident that the opposite surface will be faced off in a parallel plane. It only remains now to attach the flanged hub to the hard-metal plate by means of bolts, and in order to do so the hard-metal plate is allowed to remain attached to the chuck, the flanged hub is slipped on a plain spindle, E, and the latter secured between centers of the lathe; and while the shaft and grinding-plate are held as described, the flange of hub, having holes slightly larger than the bolts, is bolted to the grinding-plate. The shaft, held as described, accurately centers the hole for spindle as regards the cutting-teeth; and as both the surface of grinding-plate and that of the flange, where bolted together, had previously been made true—one by grinding and the other by being held in a true plane while being bored—the truthfulness of the grinding-plate when mounted on its spindle is assured. The spindle E is formed with a threaded portion, $e$, raised above the other part, and made to fit the threaded chamber in the hub. If this chamber be in the back side of the hub, as in the drawings, I make a left-handed thread, so that when used the forward motion of the crank or fly wheel will keep the spindle always tightly attached to the hub, such grinders, when attached by other means, being liable to work loose on the spindle. I also, by this means of attachment, secure another desirable feature—*i. e.*, the grinding-plate can be at once removed from its spindle without the use of tools, and by any unskilled person, by simply setting the mill close, as in fine grinding, and turning backward, when the spindle will back out of its position, and the grinding-plate can be removed and another screwed on. Thus the user of a mill can readily and without tools remove and replace the grinder, should it become necessary by reason of breakage or wear.

I claim—

The method herein described of preparing the burr of an iron mill for attachment to its spindle, consisting in taking a separate soft-metal hub provided with a flange for connecting it with the burr, in securing the hub to the face-plate of a lathe and boring it in that position, in grinding the back of the burr in a lathe, and, finally, in attaching the hub-flange to the ground back of the burr, all substantially as described.

In testimony whereof I have signed my name to this specification in the presence of two subscribing witnesses.

WILLIAM J. LANE.

Witnesses:
JOHN G. LANE,
JOHN H. SCHICK.